United States Patent
Qiu

(10) Patent No.: US 10,588,194 B1
(45) Date of Patent: Mar. 10, 2020

(54) ARBITRARY-RATIO ANALOG CURRENT DIVISION CIRCUIT

(71) Applicant: Lumileds LLC, San Jose, CA (US)

(72) Inventor: Yifeng Qiu, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/145,053

(22) Filed: Sep. 27, 2018

(51) Int. Cl.
*H05B 33/08* (2006.01)

(52) U.S. Cl.
CPC ..... *H05B 33/0866* (2013.01); *H05B 33/0812* (2013.01); *H05B 33/0815* (2013.01)

(58) Field of Classification Search
None
See application file for complete search history.

(56) References Cited

U.S. PATENT DOCUMENTS

| 2009/0187925 A1* | 7/2009 | Hu | H05B 33/0815 719/327 |
| 2013/0015774 A1 | 1/2013 | Briggs | |
| 2014/0247590 A1 | 9/2014 | Wilcox et al. | |
| 2015/0076999 A1* | 3/2015 | Malinin | H05B 33/0815 315/186 |
| 2017/0374712 A1* | 12/2017 | Qu | B60Q 1/34 |
| 2018/0027626 A1* | 1/2018 | Wang | H05B 33/0815 315/186 |
| 2018/0092172 A1* | 3/2018 | Yoo | H05B 33/0815 |
| 2019/0045595 A1* | 2/2019 | Johnsen | H05B 33/0815 |

FOREIGN PATENT DOCUMENTS

| EP | 3240368 | 11/2017 |
| WO | 2017/114146 | 7/2017 |

* cited by examiner

*Primary Examiner* — Raymond R Chai
(74) *Attorney, Agent, or Firm* — Schwegman Lundberg & Woessner, P.A.

(57) ABSTRACT

A circuit for dividing a single current source into two or more current channels is disclosed. The circuit may comprise a voltage controlled current source, a first sense resistor to sense a first sensed voltage of a first current channel, a second sense resistor to sense a second sensed voltage of a second current channel, a computational device configured to compare the first sensed voltage to the second sensed voltage to determine an output voltage, a first voltage control switch to power a first LED array, a second voltage control switch to power a second LED array, wherein the output voltage is supplied to the first control switch. The computational device may be a computational circuit or a microcontroller.

20 Claims, 6 Drawing Sheets

ARBITRARY-RATIO ANALOG CURRENT DIVISION CIRCUIT

FIELD OF INVENTION

The present invention relates to a division circuit, and more particularly to an analog current division circuit.

BACKGROUND

An LED circuit capable of dividing a current into two or more channels of equal or unequal proportions provides certain advantages. For example, multiple LED channels of different colors may share a single channel LED driver in a correlated color temperature (CCT) tuning system without the need for multi-channel DC/DC converters.

In general, there are two approaches to current division. The first method is the time-division method. In the time division method, each channel conducts the full amplitude of the input current within the allocated time slot. The second method is dividing the current by amplitude. The second method operates in the analog domain and creates multiple currents of small amplitudes, the sum of which is equal to that of the input current. Dividing a current by amplitude provides certain advantages, including but not limited to, avoiding switching noise and maximizing the utilization of LEDs, thereby increasing the efficacy.

In general, analog current division in LEDs achieved though parallel LED arrays. Resistors are connected in series on each array in order to linearize the forward voltage. Parallel LED arrays are best driven with equal current so as to avoid current hogging. Therefore the current must be divided into equal proportions and the system can only deal with a very limited amount of mismatch between the parallel LED arrays.

It would be beneficial to provide an LED circuit capable of dividing a current into two or more channels via parallel LED arrays in which the current is divided into arbitrary rations and can deal with a large mismatch between the parallel LED arrays.

SUMMARY

Circuits and methods for dividing a single current source into two or more current channels are provided. The circuits and method of the present disclosure allow a single current source to be divided into arbitrary ratios and can tolerate a large mismatch between the current channels.

DETAILED DESCRIPTION OF THE PREFERRED EMBODIMENTS

In the following description, numerous specific details are set forth, such as particular structures, components, materials, dimensions, processing steps, and techniques, in order to provide a thorough understanding of the present embodiments. However, it will be appreciated by one of ordinary skill of the art that the embodiments may be practiced without these specific details. In other instances, well-known structures or processing steps have not been described in detail in order to avoid obscuring the embodiments. It will be understood that when an element such as a layer, region, or substrate is referred to as being "on" or "over" another element, it can be directly on the other element or intervening elements may also be present. In contrast, when an element is referred to as being "directly on" or "directly" over another element, there are no intervening elements present. It will also be understood that when an element is referred to as being "beneath," "below," or "under" another element, it can be directly beneath or under the other element, or intervening elements may be present. In contrast, when an element is referred to as being "directly beneath" or "directly under" another element, there are no intervening elements present.

In the interest of not obscuring the presentation of embodiments in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments described herein.

Figure 1:
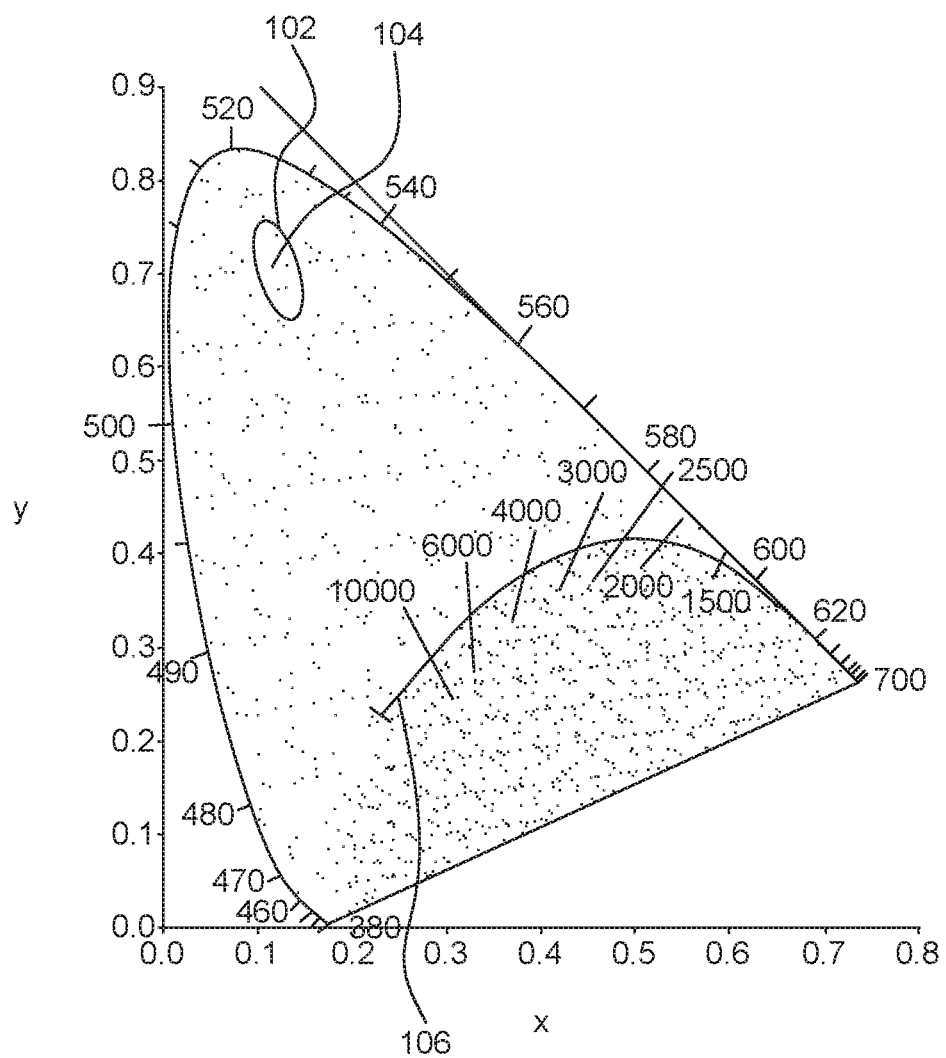
FIG. 1 is a chromaticity diagram representing a color space.

Referring to FIG. 1, a chromaticity diagram representing a color space is shown. A color space is a three-dimensional space; that is, a color is specified by a set of three numbers that specify the color and brightness of a particular homogeneous visual stimulus. The three numbers may be the International Commission on Illumination (CIE) coordinates X, Y, and Z, or other values such as hue, colorfulness, and luminance. Based on the fact that the human eye has three different types of color sensitive cones, the response of the eye is best described in terms of these three "tristimulus values."

A chromaticity diagram is a color projected into a two-dimensional space that ignores brightness. For example, the standard CIE XYZ color space projects directly to the corresponding chromaticity space specified by the two chromaticity coordinates known as x and y, as shown in FIG. 1.

Chromaticity is an objective specification of the quality of a color regardless of its luminance. Chromaticity consists of two independent parameters, often specified as hue and colorfulness, where the latter is alternatively called saturation, chroma, intensity, or excitation purity. The chromaticity diagram may include all the colors perceivable by the human eye. The chromaticity diagram may provide high precision because the parameters are based on the spectral power distribution (SPD) of the light emitted from a colored object and are factored by sensitivity curves which have been measured for the human eye. Any color may be expressed precisely in terms of the two color coordinates x and y.

All colors within a certain region, known as a MacAdam ellipse (MAE) 102, may be indistinguishable to the average human eye from the color at the center 104 of the ellipse. The chromaticity diagram may have multiple MAEs. Standard Deviation Color Matching in LED lighting uses deviations relative to MAEs to describe color precision of a light source.

The chromaticity diagram includes the Planckian locus, or the black body line (BBL) 106. The BBL 106 is the path or locus that the color of an incandescent black body would take in a particular chromaticity space as the blackbody temperature changes. It goes from deep red at low temperatures through orange, yellowish white, white, and finally bluish white at very high temperatures. Generally speaking, human eyes prefer white color points not too far away from the BBL 106. Color points above the black body line would appear too green while those below would appear too pink.

One method of creating white light using light emitting diodes (LEDs) may be to additively mix red, green and blue colored lights. However, this method may require precise calculation of mixing ratios so that the resulting color point is on or close to the BBL 106. Another method may be to mix two or more phosphor converted white LEDs of different correlated color temperatures (CCTs). This method is described in additional detail below.

To create a tunable white light engine, LEDs having two different CCTs on each end of a desired tuning range may be used. For example, a first LED may have a CCT of 2700K, which is a warm white, and a second LED may have a color temperature of 4000K, which is a neutral white. White colors having a temperature between 2700K and 4000K may be obtained by simply varying the mixing ratio of power provided to the first LED through a first channel of a driver and power provided to the second LED through a second channel of the driver.

Figure 2:
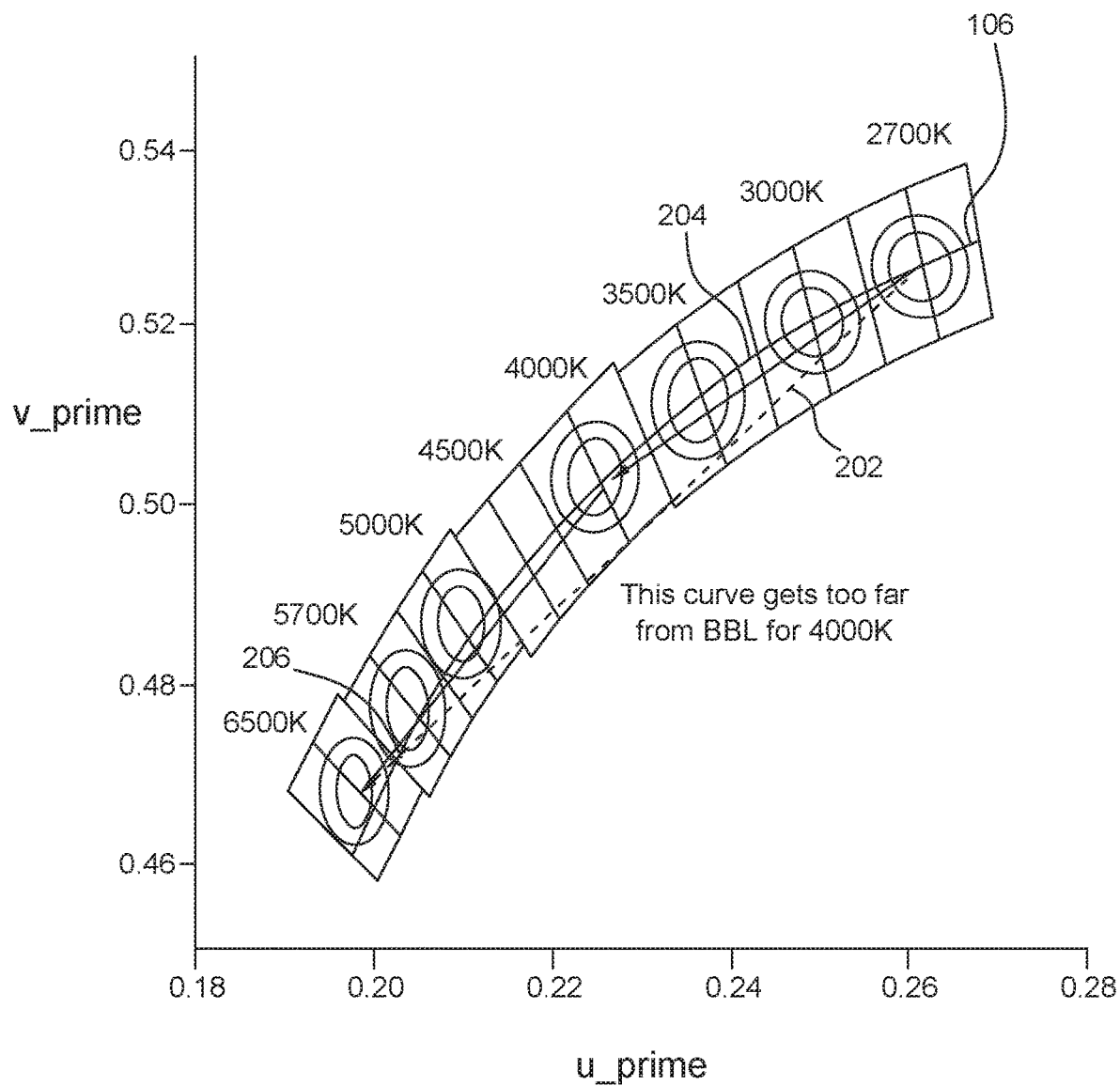
FIG. 2 is a diagram illustrating different correlated color temperatures (CCTs) and their relationship to a black body line (BBL) on the chromaticity diagram.

Referring now to FIG. 2, a diagram illustrating different CCTs and their relationship to the BBL 106 is shown. When plotted in the chromaticity diagram, the achievable color points of mixing two LEDs with different CCTs may form a first straight line 202. Assuming the color points of 2700K and 4000K are exactly on the BBL 106, the color points in between these two CCTs would be below the BBL 106. This may not be a problem, as the maximum distance of points on this line from the BBL 106 may be relatively small.

Dividing one current sink or current source into N channels essentially creates N current sinks or N current sources. According to Kirchhoff's current laws, the sum of all the currents flowing into one node must be zero. As such, at any node in an electrical circuit, the sum of currents flowing into that node is equal to the sum of currents flowing out of that node. Stated another way, the algebraic sum of currents in a network of conductors meeting at a point is zero. This principle may be stated as the following equation:

$$\Sigma_{k=1}^{n} I_k = 0 \quad \text{Equation (1)}$$

However, in practice it is nearly impossible to create N regulated currents whose sum is precisely equal to the input current being divided. This is because, in general, the input current is not known.

Figure 3:
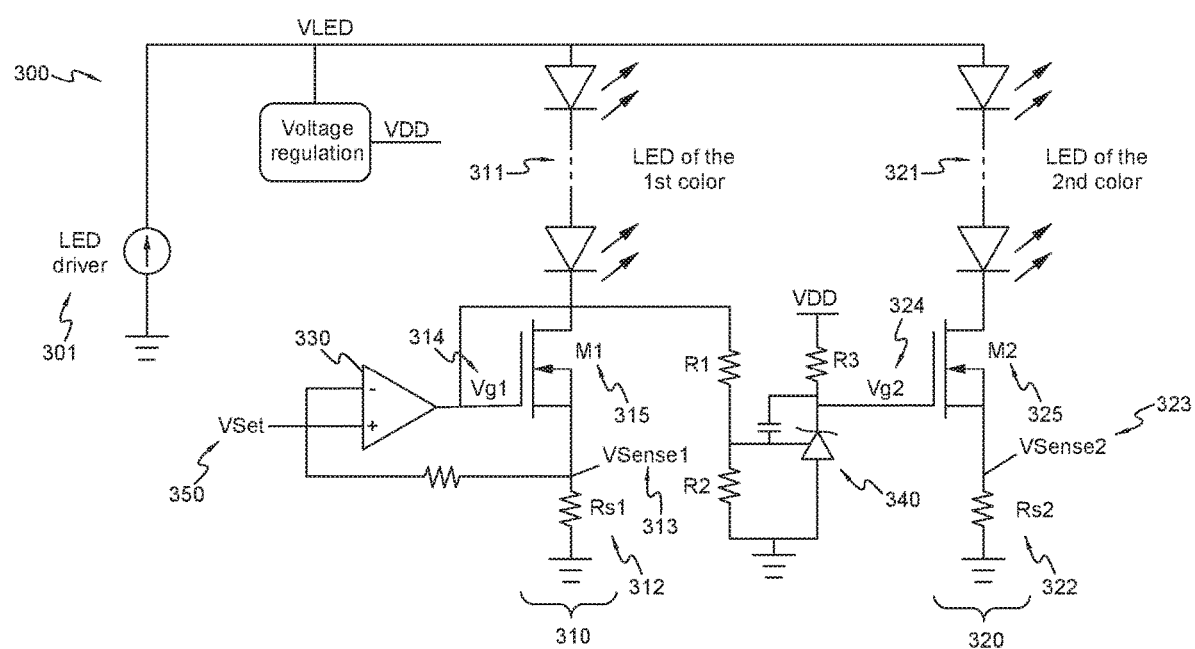
FIG. 3 is a circuit diagram of a current division circuit of the present disclosure.

Referring to FIG. 3, a circuit diagram of a current division circuit 300 is shown. The current division circuit 300 makes use of various analog techniques, such as voltage sensing, voltage control current source, and negative feedback.

As described in more detail below, the current division circuit of the present disclosure may enable dividing an input current into two or more current channels. The current division circuit of the present disclosure comprises at least one regulated current channel and the number of regulated current channels is one less than the total number of current channels. For example, if there is a total of three current channels, there can only be two regulated current channels.

In an embodiment, the current division circuit may be mounted on a converter printed circuit board (PCB) between an LED driver 301 and a LED board. The LED driver 301 may be a conventional LED driver known in the art. The current division circuit may allow the LED driver 301 to be used for applications requiring two or more LED arrays. For example, the LED driver 301 of current division circuit 300 may be used to power a first LED array 311 and a second LED array 321.

In an embodiment, the LED driver 301 is used to power two LED arrays having different CCTs. In other embodiments, the two LED arrays may have different color ranges, infrared (IR) ranges, and ultraviolet (UV) ranges.

Each current channel of the current division circuit comprises a sense resistor. For example, in an embodiment with two current channels, the current division circuit comprises a first sense resistor ($R_{s1}$) 312 to sense a first sensed voltage of the first current channel 310 at $V_{sense1}$ 313 and a second sense resistor ($R_{s2}$) 322 to sense a second voltage of the second current channel 320 at $V_{sense2}$ 323. The voltage at $V_{sense1}$ 313 is representative of the current flowing through the first sense resistor ($R_{s1}$) 312 and the voltage at $V_{sense2}$ 323 is representative of the current flowing through the second sense resistor ($R_{s2}$) 322.

The current division circuit 300 of the present disclosure further comprises a computational device (not shown). The computational device is configured to compare the first sensed voltage ($V_{sense1}$) 313 and the second sensed voltage ($V_{sense2}$) 323 to determine a set voltage ($V_{set}$) 350. If the first sensed voltage ($V_{sense1}$) 313 is lower than the second sensed voltage ($V_{sense2}$) 323, the computational device is configured to increase $V_{set}$. If the first sensed voltage ($V_{sense1}$) device is greater than the second sensed voltage ($V_{sense2}$) 323, the computational device is configured to decrease the set voltage ($V_{set}$) 350.

The set voltage ($V_{set}$) 350 may be fed to a voltage controlled current source, which may be implemented with a first operational amplifier (opamp) 330. The first opamp 330 may provide a first gate voltage ($V_{g1}$) 314. The first gate voltage ($V_{g1}$) 314 may be input to a first transistor (M1) 315 that is used to provide a driving current for the first LED array 311. The first transistor (M1) 315 may be a conventional metal oxide semiconductor field effect transistor (MOSFET). The first transistor M1 may be an n-channel MOSFET.

A second transistor (M2) 325 may control power to the second LED array 321. The second transistor (M2) 325 may be a conventional metal oxide semiconductor field effect transistor (MOSFET). The second transistor M2 may be an n-channel MOSFET. The second transistor (M2) 325 may only be switched on when the first circuit channel 310 is in regulation. A second gate voltage ($V_{g2}$) 324 may flow through the second transistor (M2) 325.

The second gate voltage ($V_{g2}$) 324 may be fed to a REF input of a shunt regulator 340. In an embodiment, the shunt regulator 340 has an internal reference voltage of 2.5V. When the voltage applied at the REF node is higher than 2.5V, the shunt regulator 140 may sink a large current. When the voltage applied at the REF node is lower than 2.5V, the first shunt regulator may sink a very small quiescent current.

The large sinking current may pull the gate voltage of the second transistor (M2) 325 down to a level below its threshold, which may switch off the second transistor (M2)

325. The shunt regulator 340 may not be able to pull their cathodes more than the forward voltage ($V_f$) of a diode below their REF nodes. Accordingly, the second transistor (M2) 325 may have a threshold voltage that is higher than 2.5V. Alternatively, a shunt regulator with a lower internal reference voltage, such as 1.24V, may be used.

Figure 4:
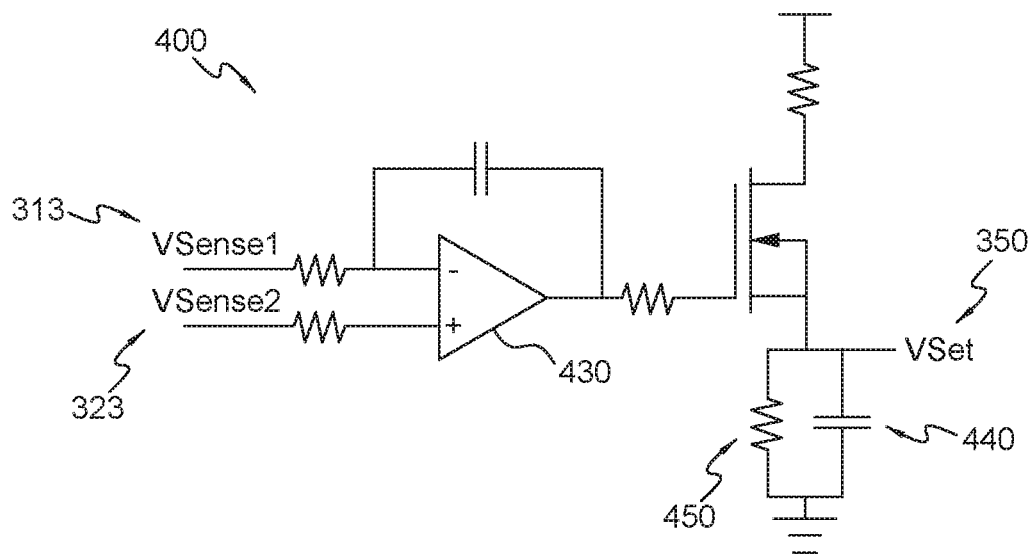
FIG. 4 is a circuit diagram of a computational circuit that may be used with the analog current division circuit of FIG. 3

Referring to FIG. 4, the computational device may be a computational circuit 400. The computational circuit 400 may comprise a second opamp 430, a capacitor 440 between the location of the set voltage ($V_{set}$) 350 and the ground, and a resistor 450 in parallel to the capacitor 440. The first sensed voltage ($V_{sense1}$) 313 and the second sensed voltage ($V_{sense2}$) 323 are fed to the second op amp 430. The computational circuit 400 may be configured to compare the first sensed voltage ($V_{sense1}$) 313 to the second sensed voltage ($V_{sense2}$) 323 by subtracting the first sensed voltage ($V_{sense1}$) 313 from the second sensed voltage ($V_{sense2}$) 323.

When the second opamp 430 is in regulation, the computational circuit 400 may be configured to convert the difference of the first sensed voltage ($V_{sense1}$) 313 and the second sensed voltage ($V_{sense2}$) 323 into a charging current to charge the capacitor 440 to increase the set voltage ($V_{set}$) 350 when the first sensed voltage ($V_{sense1}$) 313 is less than the second sensed voltage ($V_{sense2}$) 323. The computational circuit 400 may be configured to convert the difference of the first sensed voltage ($V_{sense1}$) 313 and the second sensed voltage ($V_{sense2}$) 323 into a discharging resistor 450 to decrease the set voltage ($V_{set}$) 350 when the first sensed voltage ($V_{sense1}$) 313 is greater than the second sensed voltage ($V_{sense2}$) 323.

Therefore, if the first sensed voltage ($V_{sense1}$) 313 is higher than the second sensed voltage ($V_{sense2}$) 323, the computational circuit 400 may decrease the set voltage ($V_{set}$) 350 which in turn decreases the first gate voltage ($V_{g1}$) 314 which supplies power to the first current channel 310. Stated another way, when the second opamp 430 is in regulation, the first sensed voltage ($V_{sense1}$) 313 is approximately equal to second sensed voltage ($V_{sense2}$) 323. Therefore during steady state, the ratio of the current of the first current channel 310 to the current of the second current channel 320 is equal to the value of the second sense resistor ($R_{s2}$) 322 to the value of the first sense resistor ($R_{s1}$) 312, and the following equations are satisfied:

$$I_{Rs1} = \frac{V_{set}}{R_{s1}}; \quad \text{Equation (2)}$$

$$I_{Rs2} = \frac{V_{set}}{R_{s2}}. \quad \text{Equation (3)}$$

Therefore, when the value of the first sense resistor ($R_{s1}$) 312 equals the value of the second sense resistor ($R_{s2}$) 322, the current flowing through the first resistor ($I_{Rs1}$) equals the current flowing through the second resistor ($I_{Rs2}$) and the current division circuit 300 divides the current into two equal parts, assuming the current drawn by the auxiliary circuits, such as supply voltage generation, is negligible.

It should be noted that the computational circuit 400 should be tested for closed-loop behavior and stability and adjusted accordingly.

It should further be noted that, as will be appreciated by one having ordinary skill in the art, the computational circuit 400 illustrated in FIG. 4 is one of many possible implementations.

As previously noted, the current division circuit 300 may be divided into three or more channels. For example, the first current channel 310 may be replicated so that there is a first current channel, a second current channel, and a third current channel. The first current channel and the second current channel would be regulated current channels, such as the first current channel 310 of the current division circuit 300 shown in FIG. 3. The third current channel would not be regulated and would resemble the second current channel 320 of the current division circuit 300 shown in FIG. 3.

It should also be noted that the computational circuit 400 illustrated in FIG. 4 may become complicated for circuit division circuits dividing one current source into three or more current channels. As such, the computation circuit illustrated in FIG. 4 may be replaced with a microcontroller.

Figure 5:
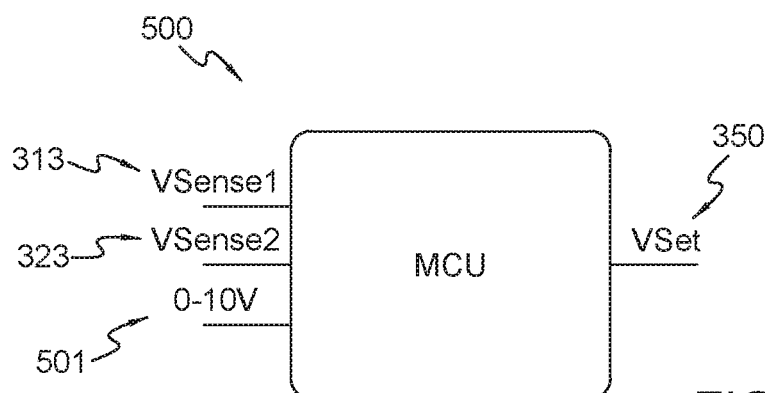
FIG. 5 is a microcontroller that may be used with the current division circuit of FIG. 3.

Referring to FIG. 5, in one embodiment, the computational device may be a microcontroller 500, which can handle complex signal processing with less PCB resources than analog circuits. The microcontroller 500 digitizes three analog signals with its internal ADC: the first sensed voltage ($V_{sense1}$) 313, the second sensed voltage ($V_{sense2}$) 323, and a control signal 501. As the value of the first sense resistor ($R_{s1}$) 312 and the value of the second sense resistor ($R_{s2}$) 322 are known, the total input current is determined using the following equation:

$$I_{total} = \frac{V_{sense1}}{R_{s1}} + \frac{V_{sense2}}{R_{s2}}. \quad \text{Equation (4)}$$

Figure 6:
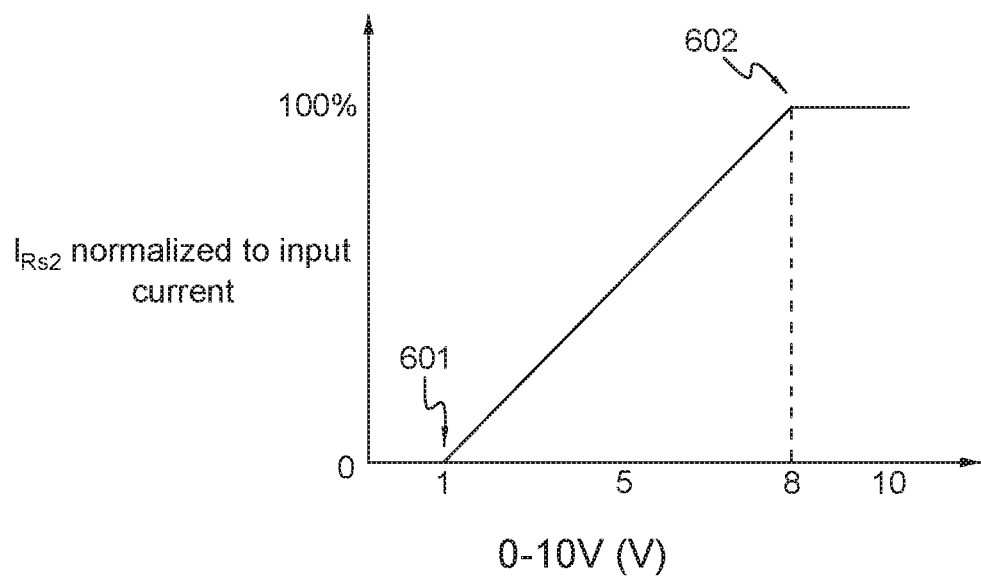
FIG. 6 is graph of a control signal that is fed into the microcontroller of FIG. 5.

Referring to FIG. 6, a ratio of the first sensed voltage ($V_{sense1}$) 313 to the second sensed voltage ($V_{sense2}$) 323 is modulated by a control signal 501 of the microcontroller. The microcontroller calculates the ratio of the first sensed voltage ($V_{sense1}$) 313 to the second sensed voltage ($V_{sense2}$) 323. The control signal 501 is mapped to the ratio of the first sensed voltage ($V_{sense1}$) 313 to the second sensed voltage ($V_{sense2}$) 323. When the control signal 501 is less than or equal to a first predetermined voltage 601, all of the input current is directed to the first current channel. When the control signal 501 is greater than or equal to a second predetermined voltage 602, all of the input current is directed to the second current channel. When the control signal 501 is between the first predetermined voltage 601 and the second predetermined voltage 602, the current may be scaled linearly between the first current channel and the second current channel. The current may also be scaled according to other curves and knee points. For example, between the first predetermined voltage 601 and the second predetermined 602 threshold the current may be staircased to provide stepped control.

In one embodiment, the control signal 501 has a range of 0-10V and the first predetermined voltage is 1V and the second predetermined voltage is 8V. Therefore, when the 0-10V control signal is less than or equal to 1V, all of the input current goes to the first current channel. When the 0-10V signal is greater than or equal to 8V, all of the input current goes to the second current channel. When the 0-10V signal is between 1V and 8V, the current is scaled linearly between the two channels.

The choice of the value of the first resistor ($R_{s1}$) 312 and the value of the second resistor ($R_{s2}$) 322 is a trade-off between resolution and power consumption. For the same current, the higher the value of the first resistor ($R_{s1}$) 312 and the value of the second resistor ($R_{s2}$) 322, the higher the first sensed voltage ($V_{sense1}$) 313 and the second sensed voltage ($V_{sense2}$) 323 are. A higher first sensed voltage ($V_{sense1}$) 313 and second sensed voltage ($V_{sense2}$) 323 allow the use of cheaper and less precise electrical circuits at the cost of increased power dissipation and reduced efficiency. If the value of the first resistor ($R_{s1}$) 312 is too large, it may be necessary to choose a larger MOSFET in order to have a lower internal resistance (Rds(on)). Additionally or alternatively, if the value of the first resistor ($R_{s1}$) 312 is too large, it may be necessary to have a higher supply voltage ($V_{dd}$), which makes it necessary to choose signal processing circuits capable of running at a higher voltage. This may potentially increase the cost of the circuit.

It should be noted that well-known structures shown in FIGS. 3 and 4, including one or more resistors, diodes, and capacitors, and processing steps have not been described in detail in order to avoid obscuring the embodiments described herein.

Figure 7:
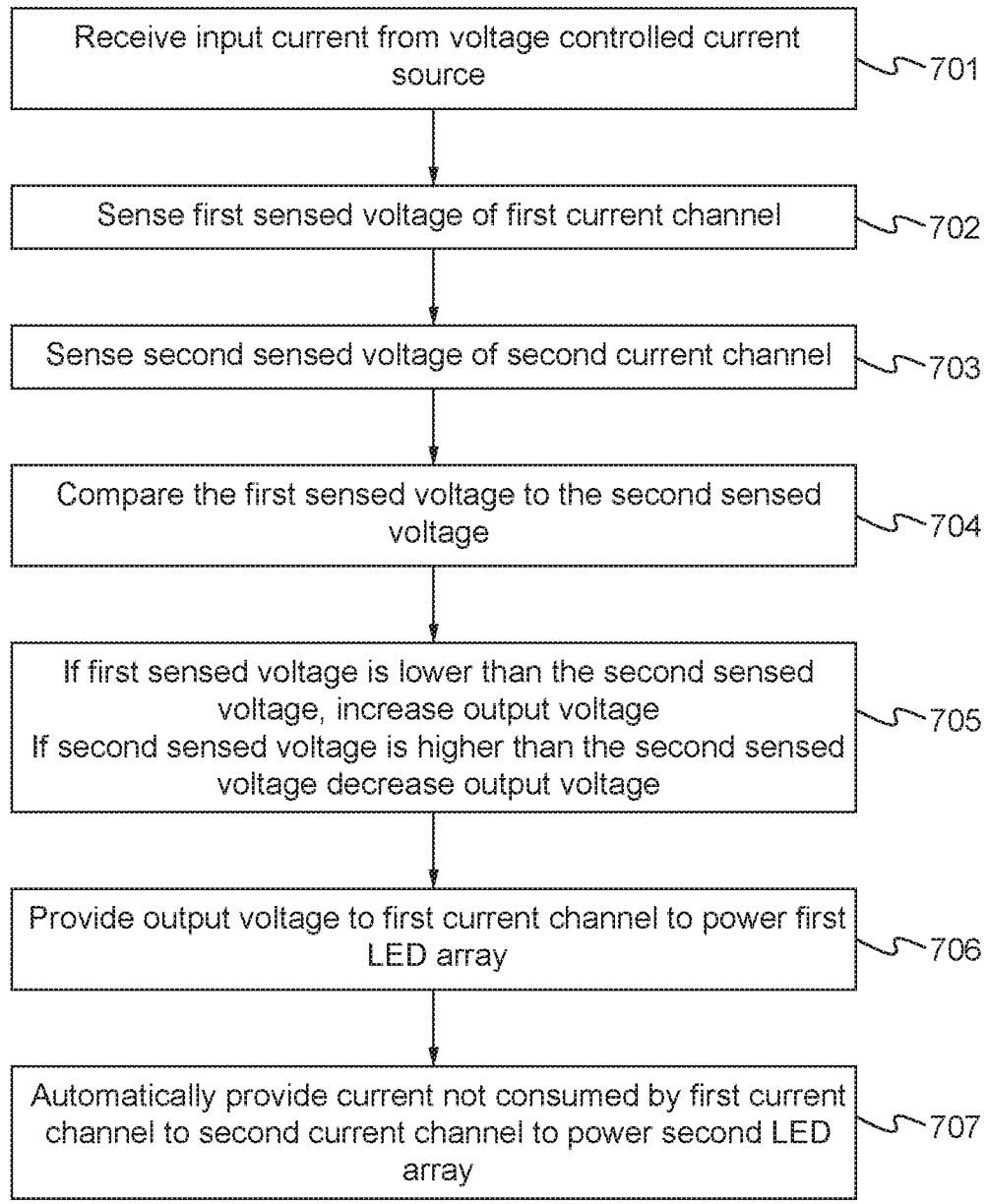
FIG. 7 is a flowchart illustrating a method for analog circuit division.

Referring now to FIG. 7, a flowchart illustrating a method for analog circuit division is shown. At step 701, an input current is received from a voltage controlled current source, such as an LED driver. At step 702, a first sensed voltage of a first current channel is sensed. At step 703, a second voltage of a second current channel is sensed. At step 704, the first sensed voltage and the second sensed voltage are compared to determine an output voltage. At step 705, if the first sensed voltage is lower than the second sensed voltage, the output voltage increases. If the first sensed voltage is higher than the second sensed voltage, output voltage decreases. At step 706, the output voltage is provided to the first current channel to power a first LED array. At step 707, the current that is left over after the first LED array has taken its share is automatically provided to the second current channel to power a second LED array.

The method shown in FIG. 7 may be performed by the current division circuit 300 utilizing the computational circuit 400 illustrated in FIG. 4. For example, at step 701, an input current may be received from the LED driver 301. At step 702, the first sense resistor ($R_{s1}$) 312 may sense a first sensed voltage ($V_{sense1}$) 313 of the first current channel 310. At step 702, the second sense resistor ($R_{s2}$) 322 may sense a second sensed voltage ($V_{sense}$) of the second current channel 320. At step 704, the first sensed voltage ($V_{sense1}$) 313 and the second sensed voltage ($V_{sense2}$) 323 may be fed into the second op amp 430 of the computational circuit 400 which compares the first sensed voltage ($V_{sense1}$) 313 and the second sensed voltage ($V_{sense2}$) 323 by subtracting the first sensed voltage ($V_{sense1}$) 313 from the second sensed voltage ($V_{sense2}$) 323. At step 705, the computational circuit 400 may convert the difference of the first sensed voltage ($V_{sense1}$) 313 and the second sensed voltage ($V_{sense2}$) 323 into a charging current to charge the capacitor 440 to increase the set voltage ($V_{set}$) 350 when the first sensed voltage ($V_{sense1}$) 313 is less than the second sensed voltage ($V_{sense2}$) 323. Further, the computational circuit 400 may convert the difference of the first sensed voltage ($V_{sense1}$) 313 and the second sensed voltage ($V_{sense2}$) 323 into a discharging resistor 450 to decrease the set voltage ($V_{set}$) 350 when the first sensed voltage ($V_{sense1}$) 313 is greater than the second sensed voltage ($V_{sense2}$) 323. The set voltage ($V_{set}$) 350 may then be supplied to the first current channel 310 to power the first LED array 311. The current that is left over after the first LED array 311 has taken its share is automatically provided to the second current channel 320 to power a second LED array 321.

Figure 8:
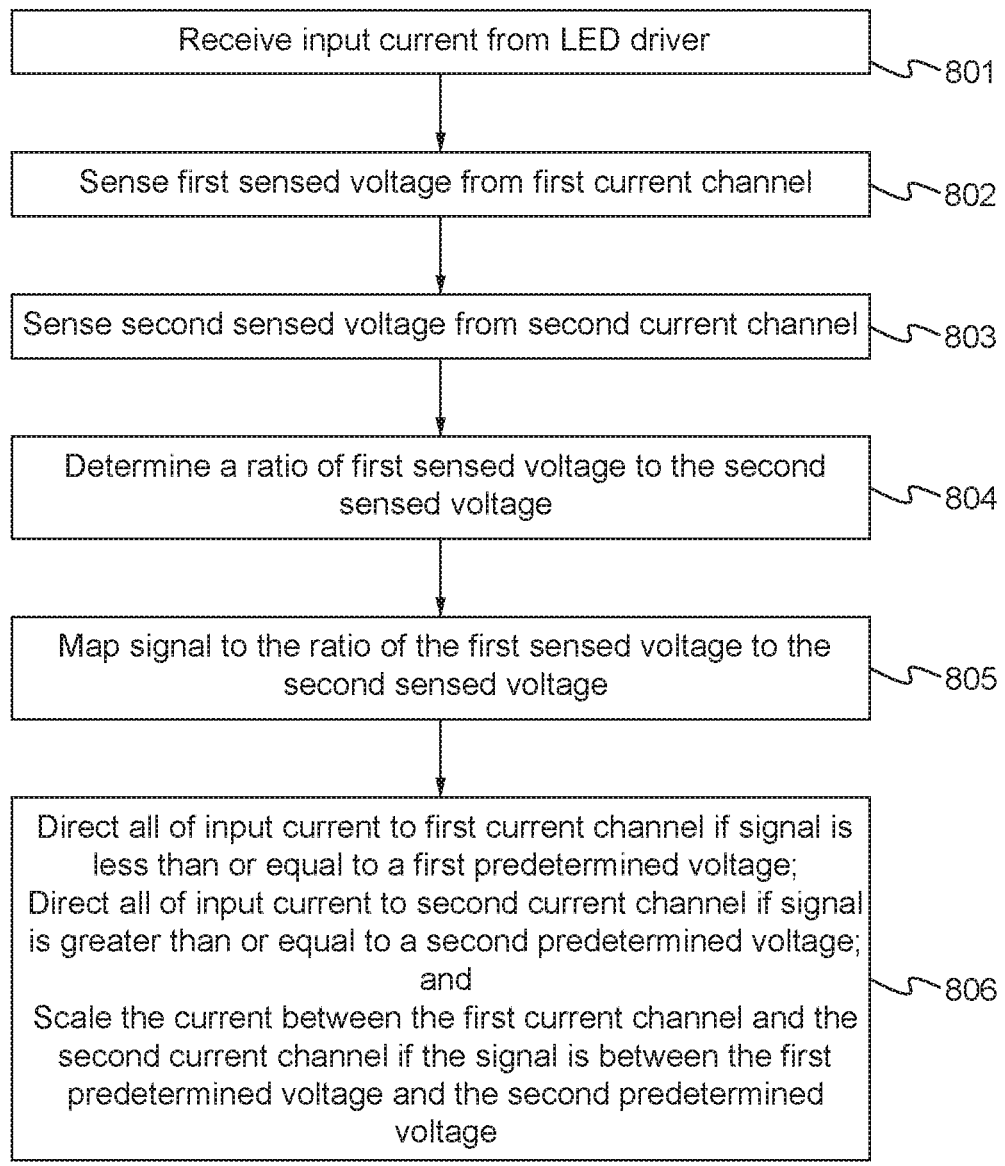
FIG. 8 is a flowchart illustrating another method for analog circuit division.

Referring now to FIG. 8, a flowchart illustrating a method for analog circuit division performed by a current division circuit comprising a microcontroller is shown. At step 801, an input current is received from a voltage controlled current source, such as an LED driver. At step 802, a first sensed voltage of a first current channel is sensed. At step 803, a second voltage of a second current channel is sensed. At step 804, a ratio of the first sensed voltage to the second sensed voltage is determined. At step 805, a control signal is mapped to the ratio of the first sensed voltage of the second sensed voltage. At step 806, when the signal is less than or equal to a first predetermined voltage, all of the input current is directed to the first current channel. If the signal is greater than or equal to a second predetermined voltage, all of the input current is directed to the second current channel. If the signal is between the first predetermined voltage and the second predetermined voltage, the current is scaled between the first current channel and the second current channel.

The method shown in FIG. 8 may be performed by the current division circuit 300 utilizing the microcontroller 500 illustrated in FIG. 5. For example, at step 801, an input current may be received from the LED driver 301. At step 802, the first sense resistor ($R_{s1}$) 312 may sense a first sensed voltage ($V_{sense1}$) 313 of the first current channel 310. At step 803, the second sense resistor ($R_{s2}$) 322 may sense a second sensed voltage ($V_{sense}$) of the second current channel 320. At step 804, the first sensed voltage ($V_{sense1}$) 313, the second sensed voltage ($V_{sense2}$) 323, and the control signal 501 are fed into the microcontroller 500 which determines a ratio of the first sensed voltage to the first sensed voltage ($V_{sense1}$) 313 to the second sensed voltage ($V_{sense2}$) 323. At step 805, the microcontroller maps the ratio of the first sensed voltage ($V_{sense1}$) 313 to the second sensed voltage ($V_{sense2}$) 323. At step 806, the microcontroller directs all of input current to the first current channel 310 if signal is less than or equal to a first predetermined voltage 601, directs all of input current to second current channel 320 if the control signal 501 is greater than or equal to a second predetermined voltage 60, and scales the current between the first current channel 310 and the second current channel 320 if the control signal 501 is between the first predetermined voltage 601 and the second predetermined voltage 602.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Having described the invention in detail, those skilled in the art will appreciate that, given the present disclosure, modifications may be made to the invention without departing from the spirit of the inventive concepts described herein. Therefore, it is not intended that the scope of the invention be limited to the specific embodiments illustrated and described.

What is claimed is:

1. A device comprising:
    a voltage controlled current source;
    a first sense resistor to sense a first sensed voltage of a first current channel;

a second sense resistor to sense a second sensed voltage of a second current channel;
a computational circuit comprising:
an operational amplifier, and
an RC circuit disposed between an output of the operational amplifier and ground, the RC circuit comprising a capacitor and resistor in parallel with the capacitor,
the operational amplifier configured to:
provide a charging current to charge the capacitor to increase an output voltage of the computational circuit when the first sensed voltage is less than the second sensed voltage, and
allow the capacitor to discharge through the resistor to decrease the output voltage when the first sensed voltage is greater than the second sensed voltage;
a first voltage control switch to power, using the voltage controlled current source, a first LED array based on the output voltage of the computational circuit; and
a second voltage control switch to power, using the voltage controlled current source, a second LED array based on the output voltage of the computational circuit.

2. The device of claim 1, further comprising a second operational amplifier coupled to the output voltage of the computational circuit and the first voltage control switch.

3. The device of claim 2, wherein an output of the second operational amplifier is coupled to a gate of the first voltage control switch.

4. The device of claim 3, further comprising a shunt regulator coupled to a gate of the second voltage control switch, the output of the second operational amplifier coupled to a reference node of the shunt regulator through a voltage divider such that when a voltage applied at the reference node is greater than a predetermined shunt voltage, the shunt regulator is configured to sink a current sufficient to pull the gate of the second voltage control switch below a predetermined threshold and switch the second voltage control switch off, and when the voltage applied at the reference node is smaller than the predetermined shunt voltage, the shunt regulator is configured to sink a quiescent current such that a voltage at the gate of the second voltage control switch is above the predetermined threshold and the second voltage control switch is switched on.

5. The device of claim 1, further comprising a shunt regulator coupled to a gate of the second voltage control switch.

6. The device of claim 5, wherein the shunt regulator has an internal reference voltage of 2.5V.

7. The device of claim 1, wherein the first LED array has a correlated color temperature (CCT) at a first tunable range and the second LED array has a CCT at a second tunable range.

8. The device of claim 1, wherein the computational circuit further comprises a computational circuit switch having a gate coupled with the output of the operational amplifier and a source coupled with the RC circuit such that the computational circuit switch is on when the first sensed voltage is less than the second sensed voltage and off when the first sensed voltage is greater than the second sensed voltage.

9. The device of claim 1, further comprising a plurality of regulated current channels that is one fewer than a total number of current channels, the first current channel being one of the regulated current channels and the second current channel being an unregulated current channel.

10. A device comprising:
a voltage controlled current source;
a first sense resistor to sense a first sensed voltage of a first current channel;
a second sense resistor to sense a second sensed voltage of a second current channel;
a microcontroller configured to:
determine a ratio of the first sensed voltage to the second sensed voltage to generate an output voltage,
map a control signal to the ratio,
direct input current to the first current channel when the control signal is at most a first predetermined voltage;
direct the input current to the second current channel when the control signal is at least a second predetermined voltage; and
scale the input current between the first and second current channels when the control signal is between the first and second predetermined voltages;
a first voltage control switch to power, using the voltage controlled current source, a first LED array;
a second voltage control switch to power, using the voltage controlled current source, a second LED array, the output voltage to be supplied to the first voltage control switch.

11. The device of claim 10, further comprising an operational amplifier coupled to the output voltage and the first voltage control switch.

12. The device of claim 10, further comprising a shunt regulator in the gate control circuit coupled to a gate of the second voltage control switch.

13. The device of claim 12, wherein the shunt regulator has an internal reference voltage of 2.5V.

14. The device of claim 10, wherein the first LED array has a correlated color temperature (CCT) at a first tunable range and the second LED array has a CCT at a second tunable range.

15. The device of claim 10, wherein:
the control signal has a range of 0-10V;
the first predetermined voltage is 1V; and
the second predetermined voltage is 8V.

16. The device of claim 10, wherein the microcontroller continually adjusts the output voltage.

17. The device of claim 10, wherein the microcontroller is configured to scale the input current at least one of linearly or in a staircased manner between the first and second current channels when the control signal is between the first and second predetermined voltages.

18. The device of claim 17, further comprising:
a shunt regulator coupled to a gate of the second voltage control switch, an output of the operational amplifier coupled to:
a gate of the first voltage control switch, and
a reference node of the shunt regulator through a voltage divider such that:
when a voltage applied at the reference node is greater than a predetermined shunt voltage, the shunt regulator is configured to sink a current sufficient to pull the gate of the second voltage control switch below a predetermined threshold and switch the second voltage control switch off, and
when the voltage applied at the reference node is smaller than the predetermined shunt voltage, the shunt regulator is configured to sink a quiescent current such that a voltage at the gate of the second voltage control switch is above the predetermined threshold and the second voltage control switch is switched on.

19. A method comprising:

receiving an input current from a voltage controlled current source;

sensing a first sensed voltage from a first current channel;

sensing a second sensed voltage from a second current channel;

calculating a ratio of the first sensed voltage to the second sensed voltage to determine an output voltage;

mapping a control signal to the ratio;

directing the input current to the first current channel when the control signal is at most a first predetermined voltage;

directing the input current to the second current channel when the control signal is at least a second predetermined voltage;

scaling the input current linearly between the first and second current channel when the control signal is between the first and second predetermined voltage; and supplying the output voltage to the first current channel to power a first LED array.

20. The method of claim 19, further comprising increasing the output voltage when the first sensed voltage is less than the second sensed voltage and decreasing the output voltage when the first sensed voltage is greater than the second sensed voltage.

\* \* \* \* \*